READ-OUT OF BISTABLE MEMORY ELEMENTS BY RESETTING FROM A FURTHER ELEMENT
Filed June 8, 1960

INVENTOR
JOHN BERNARD JAMES
BY Hane and Nydick
ATTORNEYS 3,157,863
Patented Nov. 17, 1964

3,157,863

READ-OUT OF BISTABLE MEMORY ELEMENTS BY RESETTING FROM A FURTHER ELEMENT

John Bernard James, Stevenage, England, assignor to International Computers and Tabulators Limited, London, England Filed June 8, 1960, Ser. No. 34,743
Claims priority, application Great Britain, June 9, 1959, 19,490/59
7 Claims. (Cl. 340—174)

Figures 1, 3:
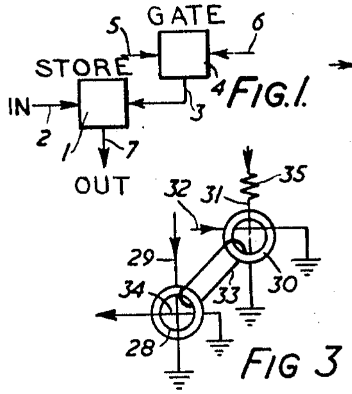

The present invention relates to devices for storing items of data in data processing apparatus and in particular to storage devices in which data items are stored by means of solid state bistable storage elements.

It has been proposed to provide a storage device in which items of data are each stored by means of a single solid state bistable storage element. A data item is stored by switching a storage element to a predetermined set state and the item is read out by resetting the element from the set state to the opposite state. An element from which a stored data item is to be read out is conveniently reset by the application thereto of coincident half current signals. The resetting of an element in this way, however, requires that the half currents are accurately controlled in order to avoid spurious signals appearing at the output terminals of the device when the element is already in the reset state or when only a single half current is applied. Moreover, where a number of storage elements are linked to a common signal path it becomes necessary to provide means for balancing out disturbances in the output signal path due to linkage between the signal and output paths. Such balancing means may restrict the speed at which data may be entered into and read out of the storage device.

It is an object of the present invention to provide an improved storage device in which an item of data is stored by means of a first solid state bistable element and a stored data item is read out under control of a second solid state bistable element.

It is another object of the invention to provide a data storage arrangement, utilising a pair of bistable storage elements coupled together, in which the rate of switching of one element determines whether or not the other element is switched.

It is a further object of the invention to provide an improved data storage arrangement utilising two matrices of magnetic storage cores, each matrix having means for setting the cores in accordance with data representing signals, and coupling means between each core of one matrix and a core of the other matrix, whereby the reading out of data stored in one matrix is controlled by the data stored in the other matrix.

According to one feature of the invention a binary data storage device includes a pair of solid state bistable elements, a reciprocal coupling between the first and second elements of the pair, first switching means operable to switch the first element from an unset to a set state to store a binary data item, second switching means operable to switch the second element from an unset to a set state at a rate such that the amplitude of signal generated in said coupling by the switching is insufficient to cause a substantial change of state of the first element, third switching means operable to switch the second element from a set to an unset state at a rate such that the signal generated in said coupling is effective to switch the first element from the set to the unset state, and read out means responsive to the switching of the first element from the set to the unset state.

According to another feature of the invention a data storage device includes a plurality of pairs of solid state bistable elements, a reciprocal coupling between the first and second elements of each pair, first switching means operable to switch selectively the first elements of the pairs of elements from an unset to a set state to store data, second switching means operable to switch all the second elements of the pairs of elements from an unset to a set state at a rate such that the amplitude of the signals generated in said couplings by the switching is insufficient to cause a substantial change of state of the related first elements, third switching means operable to switch the second elements in sequence from a set to an unset state at a rate such that the signals generated in said couplings are effective to switch the related first elements from the set to the unset state, and read out means common to all the first elements and responsive to the switching of any of the first elements from the set to the unset state.

According to a further feature of the invention a data storage device includes a plurality of pairs of solid state bistable elements arranged to form the rows and columns of a matrix, a reciprocal coupling between the first and second elements of each pair, first switching means operable to switch selectively the first elements of the pairs of elements from an unset to a set state to store data, second switching means operable to switch selectively the columns of second elements from unset to set states, each such second element being switched thereby at a rate such that the amplitude of the signals generated in said couplings by the switching is insufficient to cause a substantial change of state of the related first elements, third switching means operable to switch sequentially the rows of second elements from set to unset states at a rate such that the signals generated in said couplings are effective to switch the related first elements from the set to the unset state, and read out means common to the first elements of each column and responsive to the switching of any of the first elements from the set to the unset state.

Figure 2:
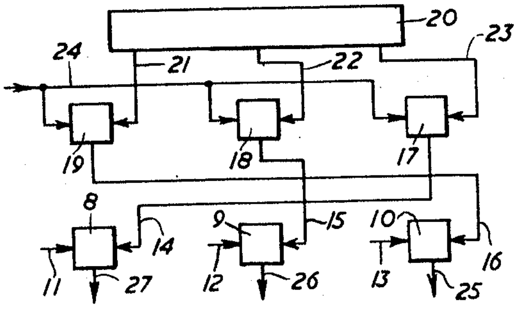
Figures 4, 5:
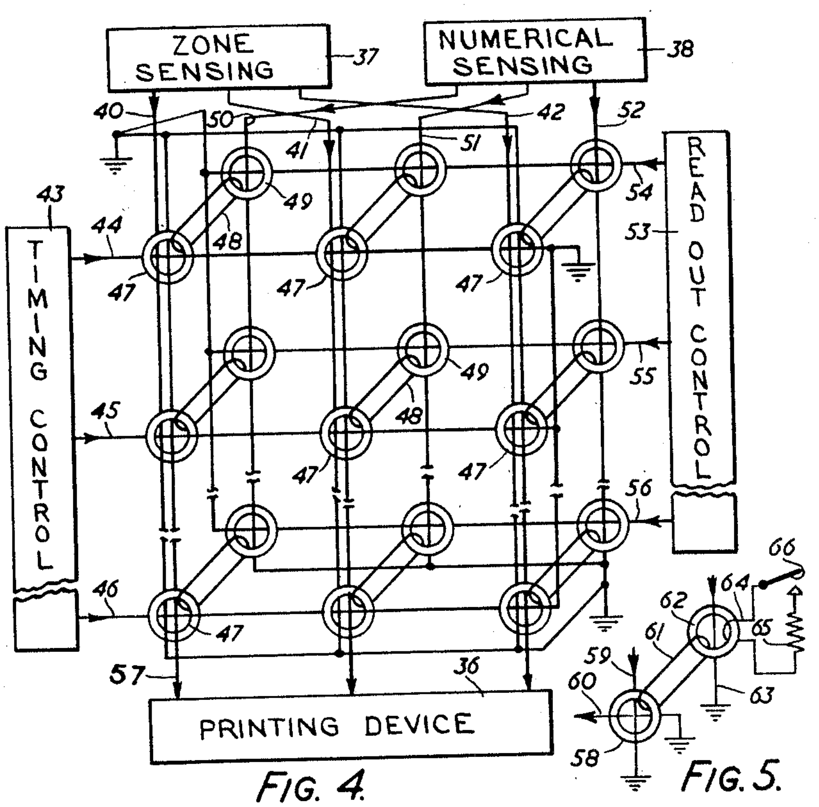

The invention will now be described, by way of example, with reference to the accompanying drawing, in which, FIGURE 1 is a schematic diagram of a storage device utilising a pair of bistable elements, FIGURE 2 shows schematically a storage device using three pairs of elements, FIGURE 3 shows a storage device formed by a single pair of magnetic storage cores, FIGURE 4 shows a storage device using a plurality of pairs of storage cores, FIGURE 5 shows an alternative circuit for controlling the switching of a storage core.

Data processing or computing apparatus is known in which input data is applied to the apparatus and forms the basis for calculating and computing operations to be performed by the apparatus. Such apparatus is commonly arranged to carry out such computing operations in a series of operating cycles, the results of the computations being subsequently recorded by a separate part of the apparatus. In the course of such operations and in connection with input and output operations it is frequently desirable to store data items. Such data items may be expressed by binary signals, the significance of the signals being related to the significance of the items of data. Consequently, the storage of such a data item may be accomplished by using a bistable element which may be switched to either of two stable states, one state signifying the presence of a particular signal and the other the absence of the signal, and the signal is used to switch the element to the required state.

Suitable solid state bistable elements for the purpose of storing items of data are, for example, ferro-magnetic cores or films. Ferro-electrical elements may also be used for this purpose.

During operation of the computing apparatus the items of data to be stored may be applied during one cycle and may be required to be read out of the storage device during one or more of a number of subsequent cycles, and the time in a cycle at which the read-out is required to take may vary from cycle to cycle. Hence, it is necessary to control the reading-out operation with reference to the particular cycle of operation currently being carried out and to the time instant within the cycle.

FIGURE 1 shows a bistable element 1 which is normally in a state which will be referred to as the unset state. A signal representing the item of data which is required to be stored is applied to the element 1 over a line 2 and is effective to switch the element to the opposite state. This state will be referred to as the set state. Thus, the storage of a data item is signified by the element being in the set state.

The element 1 is coupled by means of a path to a second bistable element 4. This element is normally in the unset state. Two signal input lines 5 and 6 are connected to the element 4 in such a way that a signal applied over line 5 tends to switch the element to its set state and a signal applied over line 6 tends to switch the element to its unset state. Signals are applied over the line 6 during each of a succession of cycles of operation of the computer, but since the element is already in the unset state, these signals cannot cause the element to switch. Just before the time when read-out of information stored by the element 1 is required, a signal is applied over the line 5 to switch the element 4 to the set state. Hence, the next following signal on line 6 causes the element 4 to switch back to the unset state. Switching of the element 4 from the set to the unset state produces on the line 3 a signal of the polarity and amplitude required to switch the storage element 1 to the unset state. Thus, if the element 1 has been set to store an information item it is now reset, which causes an output signal on output line 7. Alternatively, if the storage element 1 is already in the unset state, that is to say, no signal was applied previously to line 2 then the element 1 does not switch and no output signal is generated.

Thus, the element 1 acts as a data item storage element and the element 4 acts as a control element to control the time at which a stored item is read out.

A number of storage elements and their associated control elements may be arranged to control the distribution of items of data presented simultaneously or, alternatively, the order in which stored items are read out may be changed from the order in which the items were originally stored. An arrangement suitable for this purpose is shown in FIGURE 2. A group of storage elements 8, 9, 10 are arranged to store data items represented by signals presented respectively over lines 11, 12 and 13. The items to be stored may be presented simultaneously or they may be presented in succession, for example, the signals may be applied to the lines in the order 11, 12 and 13. The input signals are derived from a computing apparatus in conventional manner or may, for example, be derived from an input apparatus, such as a sensing device for record cards, magnetic tape or other data bearing records. The presence of a signal representing an information item causes the appropriate storage element to switch to the state.

The storage elements 8, 9 and 10 are coupled by paths 14, 15 and 16 respectively to control elements 17, 18 and 19. A signal distributing device 20 generates a succession of signals in each calculating cycle and these signals are passed over lines 21, 22 and 23 to the control elements in the order 19, 18, 17. These signals tend to switch the control elements to the unset state, but since the elements are normally already in this state the signals are ineffective.

However, immediately before the cycle during which reading out of stored information is required, a signal, derived in conventional manner from the control circuits of the computing apparatus, is applied to a line 24. This line is connected to all the control elements 17 to 19 and the effect of the applied signal is to switch these elements to the set state. Thus, during the next following cycle the signals generated by the distributor 20 are effective to switch the control elements in turn in the order 19, 18, 17.

As previously described the switching of these elements causes signals to be passed over the lines 14 to 16 to reset the storage elements in the order 16, 15, 14. Resultant output signals then appear on read-out lines 25, 26 and 27 associated with the storage elements.

It will be apparent that a similar arrangement may be used to enable simultaneous read-out of data items which have been stored at various times during the operation of the apparatus. In this case, however, the control elements 17 to 19 are all set and reset simultaneously.

FIGURE 3 shows a pair of bistable magnetic storage cores arranged to operate as a storage device in the manner described previously. Such cores are commonly used individually as storage elements and each core consists of a ring of magnetic material having a substantially rectangular hysteresis characteristic. A core may be set to one or the other of two stable states of magnetic saturation by the application of an electrical current flowing in the appropriate direction to a single conductor, or a multi-turn winding linked with the core.

Core 28 acts as the storage core and is magnetically saturated in one direction by the application of a setting signal to a conductor 29. The setting signal takes the form of a pulse of electrical current and after the application of the setting signal the core 28 remains magnetised in the direction to which it was switched. In this state the core 28 is said to be set.

Core 30 acts as the control core and is similarly set by a current applied to a conductor 31. The core 30 may be switched from the set to the unset state by a current applied to conductor 32. The cores 28 and 30 are linked by a coupling winding 33, and during the switching of the core 30 from the set to the unset state a current is induced in the winding 33 of such magnitude and direction that the core 28 is switched to the unset state if it has previously been set.

In consequence of the switching of the core 28 a current pulse is induced into a read-out winding 34. It will be appreciated that if the core 28 is already in the unset state, the current in the coupling winding 33 cannot cause switching of the core 28 and no appreciable output signal is generated.

The winding 33 forms a reciprocal coupling between the cores 28 and 30, that is, a current will flow in the winding when either of the cores is switched. However, it is desired that the cores should switch independently, except when the core 30 switches from the set to the unset state. The current flowing in the winding 33 is dependent upon the rate at which the driven core is switched and by selecting the switching rate of the driven core, the cores may be switched independently or together.

Each of the cores 28 and 30 has a substantially rectangular hysteresis loop and consequently requires a flux exceeding a certain critical value to switch it from one state of saturation to the other. The current flow produced in the coupling winding is a function of the resistance of the loop and the speed at which the driven core is switched.

In one particular practical example, the cores 28 and 30 each consisted of a 4 mm. ferrite core of the kind used in computer storage devices and the resistance of the loop formed by the coupling winding 33 was 0.04 ohm. If both cores were in the same state and the core 30 was switched in 90 microseconds, the current induced in the coupling winding was insufficient to switch the core 28. On the other hand, if the core 30 was switched in one microsecond, the current in the coupling winding was sufficient to switch the core 28 completely from one state of saturation to the other. The rate of switching of the driven core was controlled by the amplitude of the drive current applied to the drive winding, such as the winding 32. The slow switching of the core 30 was effected by a current which was only slightly in excess of the minimum required to switch the core 30 by itself, whereas the fast switching was effected by a current which was equal to twice the minimum required to switch the core 30 by itself. It will be appreciated that the switching time may also be controlled to some extent by the waveform of the current pulse used for switching, for example, by the steepness of the leading edge of the pulse.

The optimum value of the resistance of the coupling loop is dependent upon the particular operating conditions. The maximum value is determined by the desirability of ensuring that the core 30 can switch the core 28 completely. If both cores are set and the core 30 is then switched rapidly to the unset state, the core 28 will be switched towards the unset state, but the switching will not be complete if the resistance of the coupling winding limits the circulating current too much. The core 30 may then be switched slowly back to the set state, leaving the state of the core 28 unchanged. Fast switching of the core 30 to the unset state will complete the switching of the core 28. The first partial switching of the core 28 will induce an output pulse in the winding 34, and the second partial switching will induce a further output pulse, which is unwanted. This increases the difficulty of differentiating between the outputs for the set and unset states of the core.

On the other hand, as the resistance of the coupling winding is reduced, the slow switching time of the cores must be increased to ensure independent operation.

It will be appreciated that the ratio between the slow and fast switching times of the core 30 must be sufficient to ensure that independent and combined switching, respectively, are possible, but the actual switching times are selected in accordance with the particular application of the circuit and the constants of the cores and the coupling winding.

It will be appreciated that the storage core may be set in conventional manner by the use of coincident current technique where two or more setting currents each of a lower value than is necessary for switching a core are applied simultaneously to the core to cause it to switch. The value of the individual currents is adjusted so that the coincidence of the required number of part-currents is just sufficient to cause switching.

If it is desired to provide storage for a substantial number of items, it is convenient to utilise an arrangement comprising a matrix of storage elements, and a corresponding matrix of gating elements, each storage element being coupled to a corresponding one of the gating elements, such an arrangement using magnetic storage cores is shown in FIGURE 4.

The matrix arrangement shown provides a storage device for information items which is suitable for controlling, for example, a recording device from data sensed from conventional record cards. In order to explain the operation of the storage device it is convenient to consider firstly the operations of sensing data from the cards and of recording the data sensed.

Data to be recorded is represented on record cards in conventional manner by means of perforations arranged in columns. An item of data, for example, an alphabetical or numeral character is represented in a single column of the card by a perforation in one or both of two groups of perforation positions.

The first of these groups consists of ten positions to which the values 0 to 9 are assigned. A single perforation in only this group therefore represents the numerical character of value corresponding to the position occupied by the perforation.

The second group of perforation positions is used in conjunction with a perforation in the numerical group to represent an alphabetical character. The positions in this group are referred to as zone positions and are termed Z, Y and X positions respectively for identification purposes. Thus, the letter B for example, is represented in a card column by perforations in the Z and 2 positions, the letter K by perforations in positions Y and 2 and the letter S by perforations in positions X and 2.

The card columns are scanned by separate sensing devices, the positions in a column being scanned in sequence by a sensing device in synchronism with a timing and control mechanism.

It will be seen from the foregoing description that the characters may be regarded, for the purposes of subsequent recording, as being divided into groups determined by the value of the perforation in the numerical group of positions. For example, in the case given the characters, B, K, S and 2 form a group.

The recording device 36 (FIGURE 4) consists of a printer having a plurality of typewheels arranged side-by-side, each typewheel being settable to print the character represented by the perforations in a single card column. Each typewheel carries on its periphery type faces representing the characters to be printed and these characters are divided into groups to correspond to the groups of like numerical significance defined above, so that in order to select a particular character it is first necessary to select the particular numerical group in which the required character is to be found and then modify this selection according to the zone perforation sensed, if any.

Thus, in order to perform this selection it is necessary to store the zone information in order to control the selection of a particular character within a numerical group.

One form of card controlled printer employing a core storage selection device is described in U.S. Patent 2,892,185 filed February 19, 1957. The card sensing and timing arrangements shown schematically in this patent are suitable for use in the arrangement described herein.

A column of cores 47 is provided for each card column and the zone positions of the card columns are first sensed by a sensing arrangement 37. It will be appreciated that, although for the sake of clarity only three columns of cores are shown, in practice any desired number of columns may be used. The presence of any zone perforation of the first of these columns causes the application of a current by a zone sensing device 37 to a column winding 40 linked with all the storage cores 47 in the first column of the matrix. Column conductors 41 and 42 are similarly provided for the other card columns and are likewise controlled by the zone sensing device 37. The value of this current is a little more than half the value required to cause switching of a storage core to the set state.

Row windings 44 and 45 are provided, each linking with all the storage cores 47 in a row of the matrix and these are supplied in succession with a similar half current by a timing and control device 43, operating in synchronism with the sensing of the zone perforation positions. Again, although for clarity only two row windings are shown, in practice there are many of these windings, and consequently a corresponding number of rows of cores in the matrix, as there are zone positions to be sensed.

Thus, the presence of a perforation in a zone position in a card column causes the appropriate zone-representing storage core in the corresponding matrix column to be set. For example, if a perforation in the Z position of the first card column is sensed, half currents are applied simultaneously to windings 40 and 44 so that the storage core 47 linking with both these windings is set.

A further row of storage cores is provided and all the cores in this row are linked with an additional row winding 46. The cores in this row are set for each card sensed. Setting of these cores may be accomplished by allowing all column windings 40 to 42 to be energised during the period between sensing two successive record cards and energising the row winding 46 at this time. Alternatively this row of cores may be set by the application of a full switching current to the row winding 46, in which case the column windings 40 to 42 are not required to link with cores in this row.

The typewheels in the printing device 36 are rotated during the sensing of the numerical perforation positions of the card columns. The sensing of these positions is carried out by a sensing device 38 in synchronism with a single revolution of the typewheels.

It will be recalled that the character-representing type faces on the typewheels are arranged in groups according to numerical significance. One group of type faces passes the printing positions between sensing of successive numerical positions in a card column. For example, considering the group of characters associated with the numerical value 2 the characters in this group pass the printing positions in the order S–K–B–2 immediately after sensing the 2 position by the sensing device 38.

Thus assuming that the first card column contains perforations 2 and Y, representing the character K, the first column of storage cores contains a set core representing the storage of the Y zone and this zone information is required to be read-out after sensing the numerical value 2 to select the appropriate character K within the group of type faces associated with the numerical value 2.

Accordingly, the sensing of a perforation in a numerical position causes a setting current to be applied to the cores 49 of the column of the matrix corresponding to the card column in which the perforation is sensed. Thus, in the example given, the sensing of the perforation in the 2 position causes the first column of control elements to be set by the application of setting current to a column winding 50. Column windings 51 and 52 are provided to set the control elements of the remaining columns under similar conditions. Hence, all the cores 49 of a column are set immediately before the corresponding group of type-faces on the associated typewheel passes the printing position, if a numerical perforation is sensed.

The value of the setting current is only just sufficient to switch the cores 49, so that they switch slowly and do not disturb the state of the related cores 47.

As each type face within a group passes the printing position a resetting current is passed to the appropriate row of control elements by a read-out control distributor 53. Thus, when the type-face representing the character associated with the zone Z passes printing position a row wire 54 is energised. A row wire 55 is energised as the character associated with the zone Y passes printing position and so on. Finally, a row wire 56 is energised as the character represented by only a numerical perforation passes the printing position.

In the example, the cores 49 coupled to the Y-zone storage cores 47 are reset as the character K passes printing position. Resetting of these cores causes a resetting current to be induced in the coupling windings and the storage core which was set previously will be reset in consequence. Resetting of the storage core causes a current to be induced into a first column read-out winding 57. This output current is passed to the printing device 36 and is applied to the control grid of a gas discharge relay valve within the printer. This valve then conducts and energises a printing hammer mechanism to cause the appropriate character to be printed.

It will be appreciated that the first column of storage cores also contains a set core in the lowermost position. This core will be reset when the typeface "2" passes the printing position and will cause an output at this time. However, the circuit of the gas discharge valve will accept only a single printing impulse during a printing cycle so that the second output is ineffective to cause printing. In the case where a perforation is present in only a numerical position of a card column there will be no set zone storage core in the matrix column, so that resetting of the lowermost storage core under these circumstances causes printing of the appropriate numerical character.

The operation of the arrangement may be summarised as follows. First of all the zone positions of a card are sensed by the zone sensing device 37, and the matrix of cores 47 are set selectively to store an indication for each column of the presence of a particular zone perforation or the absence of all zone perforations. The numerical perforations are then sensed in sequence and a column of the matrix of cores 49 is set when a perforation is sensed in the corresponding card column. After each numerical index position has been sensed, and before the next index point position is sensed, the readout control 53 applies a fast switching resetting current in turn to the rows of cores 49. Any of the cores 49 which have been set at an index point will be reset at high speed and will tend to reset the associated cores 47. However, only those ones of the associated cores 47 can be switched which have previously been set by the zone sensing, and only those cores 47 which are switched will provide a substantial output signal on the related column output winding, such as 57. In this way, the occurrence of an output signal is made dependent on setting of the cores 47 of one matrix by the zone information and on setting of the cores 49 of the other matrix by numerical information.

This zone and numerical sensing devices may consist of a single set of sensing brushes together with cam controlled switching contacts which are operated in synchronism with the card sensing and which connect the brushes to the windings 40 to 42, or the windings 50 to 52, in accordance with the sensing of the zone, or numerical part of the card. Alternatively, separate sets of brushes may be permanently connected to operate the two sets of windings 40 to 42 and 50 to 52, cam controlled contacts being provided to make one set of brushes effective only when that set is sensing the zone part of the card, and to make the other set of brushes effective only for numerical sensing. It will be appreciated that the various windings such as 40, 44, 57, etc., may be multiturn, rather than single turn, if desired.

The various core arrangements described herein rely for correct operation on the fact that a core has a switching threshold, so that a switching field below a certain magnitude produces no permanent change in the state of the core to which it is applied. Ferro-electric storage elements have no such threshold, but they have a characteristic which is exponential at low levels and which becomes substantially linear at higher levels. If a pair of ferroelectric elements are reciprocally coupled together so that they form a circuit comparable with the core circuit of FIGURE 3, independent switching may be secured by switching one element at a speed such that the output signal is relatively small and the second element of the pair operates on the exponential part of the characteristic. The state of the second element will be altered each time the other element is switched, but this alteration is so small that it is of no practical significance. For example, it may be possible to switch the first element a hundred or more times before the accumulative alteration of the state of the second element is sufficiently large to be serious. On the other hand, relatively fast switching of the first element will produce a large output signal, which operates the second element on the linear part of the characteristic, and is sufficient to reverse the state of the second element.

The control of switching of the storage core is dependent upon the switching rate of the associated control core which is in turn related to the current in and the voltage across the coupling winding linking the storage and control cores. The necessary control may be exercised as described with reference to FIGURE 3 by arranging that the setting and resetting currents applied to the control core are of different values. However, it is in some circumstances convenient to use the same value of current for both setting and resetting. The necessary modification of switching rate may then be achieved by the provision of a loading winding on the control core. A circuit operating in this way is shown in FIGURE 5.

A storage core 58 is linked with a setting winding 59, a read-out winding 60 and a coupling winding 61 in a manner similar to that already described. A control core 62 is linked with the coupling winding 61. A winding 63 is provided to which a setting and a resetting current may be applied. This single winding 63 may be employed for both purposes by regulating the direction of current flow in a suitable manner. A loading winding 64 is provided and may be connected by means of contacts 66, which may for example be relay contacts, to a series load represented by a resistor 65. This load may be resistive or inductive. For example, it may merely be a resistor or it may be a winding coupled to another core. The current flowing in the winding 63 is of the value required during fast resetting of the control core so that the current induced in the coupling winding 61 is sufficient to cause resetting of the storage core 58. During the operation of setting the control core 62 the contacts 66 are closed and the loading circuit becomes effective. Currents are induced in both the loading winding 64 and the coupling winding 61 with the result that the current induced in the coupling winding 61 under these circumstances is insufficient to switch the storage core 58. Under these circumstances, too, the switching time of the control core 62 is increased as previously described. The contacts 66 are conveniently relay or mechanical contacts operated by a read-out control device such as the distributor 53 of FIGURE 4. It will be appreciated that control of the switching rate is exercised, as in the previous case, by controlling the circuit characteristics of the loading winding 64. Thus, since the impedance of an external circuit is high as compared with a core circuit it is usually necessary in practice for the loading winding 64 to be a multi-turn winding.

While there have been shown and described the fundamental novel features of the invention as applied to preferred embodiment, it will be appreciated that various alterations, omissions and substitutions in the devices illustrated may be made by those skilled in the art, without departing from the spirit of the invention. It is intended, therefore, to be limited only as indicated by the scope of the following claims.

What I claim is:

1. A binary information storage device, including a solid state bistable information storage element; a solid state bistable control element, said storage and control elements each being switchable between first and second stable states; means to set the storage element in said first state to store an item of information; coupling means coupling said storage and control elements and operative to apply a signal to said storage element in response to the switching of said control element; means operative to switch the control element slowly from said first state to said second state so that the signal applied by said coupling means to said storage element is insufficient to cause switching of said storage element, and operative to switch the control element quickly from said second state to said first state so that the signal applied by said coupling means to said storage element causes switching of said storage element from said first state to said second state to read out said item of information; and means responsive to the reading out of said item to generate an output signal.

2. A binary information storage device, including a solid state bistable information storage element; a solid state bistable control element, said storage and control elements each being switchable between first and second stable states; means to set the storage element in said first state to store an item of information; means to switch the control element slowly from said first state to said second state; means to switch the control element quickly from said second state to said first state; signal generating means operative to apply a first signal to the storage element in response to the slow switching of the control element, said first signal being insufficient to cause switching of the storage element, and operative to apply a second signal to the storage element in response to the fast switching of the control element to cause the storage element to switch from said first state to said second state; and means responsive to the switching of the storage element from said first state to said second state to generate an output signal.

3. A binary information storage device, including a solid state bistable information storage element; a solid state bistable control element, said storage and control elements each being switchable between first and second stable states; means to set the storage element in said first state to store an item of information; means to switch the control element from one of said states to the other; signal generating means coupled to said storage and control elements and operable to generate a first signal which is insufficient to cause switching of the storage element and a second signal which causes switching of the storage element from said first state to said second state, said first signal being generated in response to slow switching of the control element from said first state to said second state and said second signal being generated in response to fast switching of the control element from said second state to said first state; and means responsive to the switching of the storage element from said first state to said second state to generate an output signal.

4. A binary information storage device, including a first magnetic storage core for storing items of information; a second magnetic storage core for controlling said first core, said cores each having first and second stable states of magnetization; a coupling winding linking said cores; means to set the first core in said first state to store an item of information; means operative to switch the second core slowly from said first state to said second state to induce in said coupling winding a signal which is insufficient to cause switching of said second core, and operative to switch the second core quickly from said second state to said first state to induce in said coupling winding a signal which causes switching of the first core from said first state to said second state; and a read-out winding coupled to said first core and operative to generate an output signal in response to the switching of said first core from said first state to said second state.

5. A binary information storage device, including a plurality of pairs of bistable solid state elements, each pair comprising an information storage element and a control element, and each element being switchable between first and second stable states; coupling means for each pair of elements; means to set a selected one of the storage elements in said first state to store an item of information in said selected element; means to switch simultaneously all of the control elements slowly from said first state to said second state to generate a signal in each said coupling means which is insufficient to cause switching of the storage elements; means to switch the control element corresponding to said selected storage element quickly from said second state to said first state to generate a signal in the corresponding coupling means to cause switching of said selected storage element from said first state to said second state; and means coupled to said selected core to generate an output signal in response to the switching of said selected storage element from said first state to said second state.

6. A binary information storage device, including a plurality of pairs of bistable magnetic cores arranged in rows and columns, each pair comprising an information storage core and a control core, and each core being switchable between first and second stable states of magnetization; a separate coupling winding linking the cores of each pair, respectively; a plurality of first column conductors, each coupled, respectively, to all the storage cores of a column; a plurality of second column conductors, each coupled, respectively, to all the control cores of a column; a plurality of first row conductors, each coupled, respectively, to all the storage cores of a row; a plurality of second row conductors, each coupled, respectively to all the control cores of a row; means to energise the first column conductor and the first row conductor coupled to the storage core of a selected pair to switch that storage core to said first state to store an item of information therein; means to energise the second column winding coupled to the control core of the selected pair to switch all the control cores coupled thereto from said first to said second state slowly to induce signals in the coupling windings linked to said control elements which signals are insufficient to cause switching of the corresponding storage cores; means to energise the second row winding coupled to the control core of said selected pair to switch that control core quickly from said second state to said first state to generate a signal in the corresponding coupling winding to cause switching of the storage core of said selected pair from said first state to said second state; and a read out winding coupled to the storage core of said selected pair to generate an output signal in response to the switching of that storage core from said first state to said second state.

7. A binary information storage device, including a first solid state bistable element and a second solid state bistable element, each element being switchable between first and second stable states; a signal transfer path coupling the elements; switching current generating means coupled to the first element and operative to switch said first element from the second state to the first state and from the first state to the second state to induce a resultant signal into said signal transfer path; means for regulating the switching current during the period when said first element is switched from the second to the first state to render said resultant signal ineffecive to switch the second element and for regulating the switching current during the period when said first element is switched from the first to the second state to render said resultant signal effective to switch said second element from the first to the second state; and read-out means responsive to the switching of said second element from the first to the second state by said resultant signal to generate an output signal.

References Cited in the file of this patent

UNITED STATES PATENTS

| | | |
|---|---|---|
| 2,889,542 | Goldner | June 2, 1959 |
| 2,910,674 | Wittenberg | Oct. 27, 1959 |
| 2,978,682 | Green | Apr. 4, 1961 |